March 14, 1933.   E. WEISKER   1,901,423
COMBINED FOCUSING SCREEN AND RETAINING MEMBER FOR SENSITIZED MATERIAL
Filed March 23, 1931
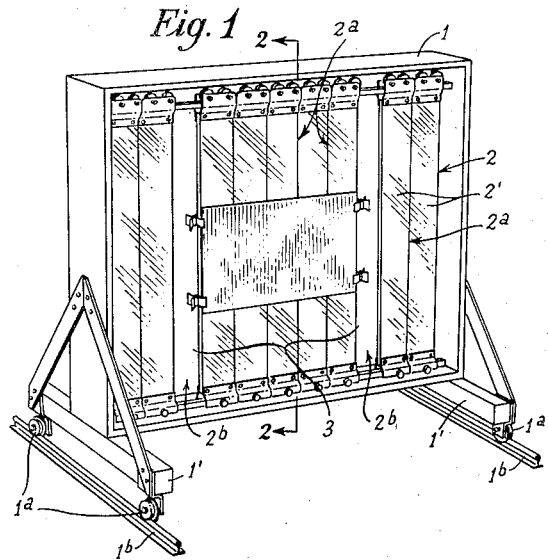
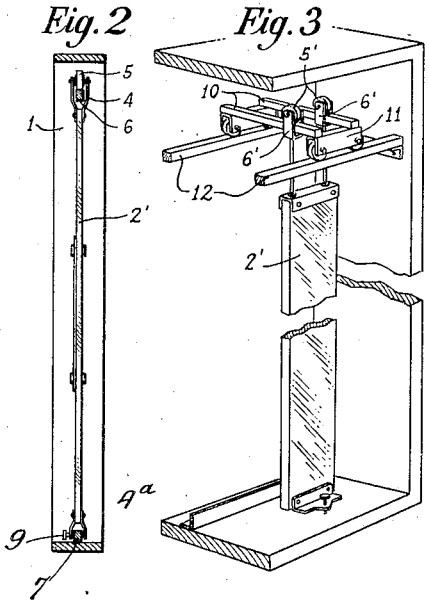
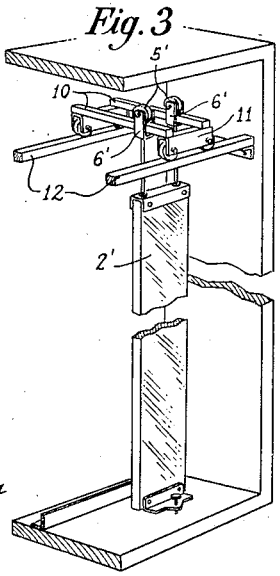
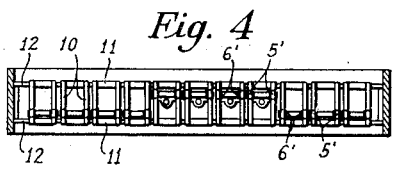
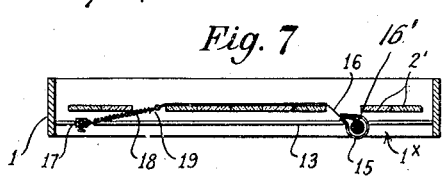
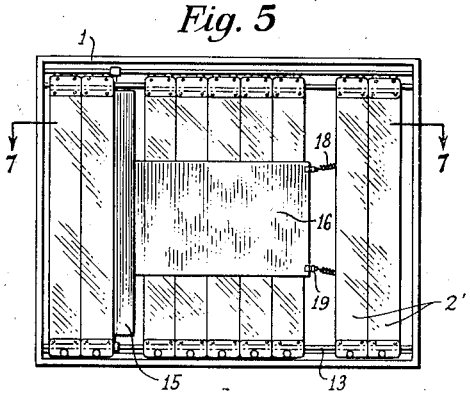
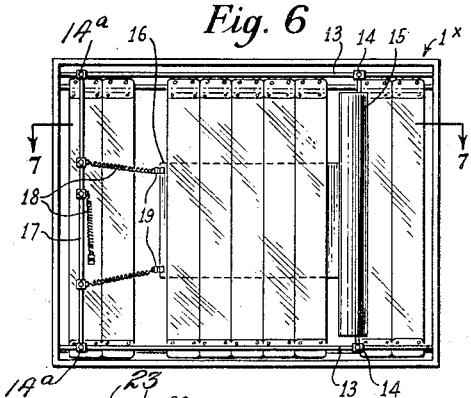
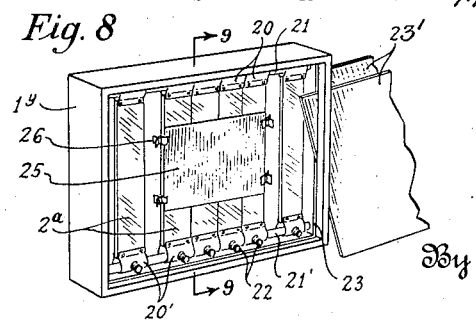

Patented Mar. 14, 1933

1,901,423

UNITED STATES PATENT OFFICE

ELLIS WEISKER, OF NEW YORK, N. Y.

COMBINED FOCUSING SCREEN AND RETAINING MEMBER FOR SENSITIZED MATERIAL

Application filed March 23, 1931. Serial No. 524,610.

This invention relates to improvements in combined focusing screen and retaining member for sensitized material.

Heretofore focusing screens of ground glass have been made in one piece and are employed in focusing and are then replaced by a holder for sensitized material positioned at the same plane of focus, or the sensitized material has been held in position by an adhesive substance on the ground-glass focusing screen.

One of the objects of this invention is to produce a focusing screen which will enable the ready and quick variation of the size thereof so that sensitized material or photographic plates of varying sizes may be fastened on such screens at the plane of focus and in the exact position on the ground-glass of the image at such plane of focus, and also to enable the determination of the limits or the area of the image on the ground glass while the image is invision so that a section of sensitized material of proper size without waste may be properly positioned after the lens is capped and the image is no longer visible, thus economizing material and eliminating waste thereof.

Still another object of my invention is to produce a focusing screen formed or composed of a plurality of sections, and preferably vertically-divided sections, each of which sections is preferably separable from the adjacent section to permit the making up by a series of sections of a screen of any desired size which will have edges available to permit the clipping thereto of sections or pieces of sensitized material of such varying sizes as may be required for photo reproductions for which the focusing screen has been set.

Still another object of my invention is to enable the mounting of focusing screen sections so that the sections may be readily and quickly separable from each other and to provide means whereby these movable sections may be readily and quickly mounted in fixed relationship and alignment with each other.

Still another object of my invention is to provide a mounting arragnement for the sections of a sectional focusing screen in which the sections will always be maintained in the same or parallel vertical planes and means will be provided whereby one or more of such sections may readily and quickly be moved out of alignment so as to free the edge of the adjacent member to permit clips to be applied thereto for the purpse of mounting thereon strips or sections of sensitized material of varying sizes.

Still another object of my invention is to provide means for mounting a roll of sensitized material in connection with a sectional frame in such manner as to enable sections of such sensitized material of varying sizes to be fed from the roll across the screen.

Still another object of my invention is to provide in combination with a sectional focusing screen a light-proof holder so as to enable a single holder to be utilized for focusing in connection with plates or pieces of sensitized material of varying sizes and also to permit the movement of such plates of sensitized material of varying sizes through illuminated rooms for examination and development or the like.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawing, in which:—

Fig. 1 is a front elevation of a focusing screen embodying my invention;

Fig. 2 is a section on the line 2—2 of Fig. 1, looking in the direction of the arrow;

Fig. 3 is a view, in perspective, of a modified form of mounting means whereby the screen sections may be moved transversely of the general plane of the sections as well as longitudinally of such plane;

Fig. 4 is a plan view of the construction shown in Fig. 3;

Fig. 5 is a front elevation of a focusing screen embodying my invention, showing a roll of sensitized material mounted thereon;

Fig. 6 is an elevation of the opposite or rear side of the screen shown in Fig. 5;

Fig. 7 is a section on the line 7—7 of Figs. 5 and 6, looking in the direction of the arrow;

Fig. 8 is a perspective view showing a light-proof box and illustrating my sectional screen mounted therein; and Fig. 9 is a section on the line 9—9 of Fig. 8, looking in the direction of the arrow.

Referring now to the drawing, which illustrates a preferred embodiment of my invention, 1 indicates a suitable frame which, in Figs. 1 and 2, is mounted on base members 1', provided with wheels 1ª and movable toward and away from the lens of a camera, not shown, on tracks 1ᵇ. Mounted within the frame 1 is a focusing screen 2 comprising a series of sections 2' which, in the embodiment shown, are separated from each other by vertical dividing lines 2ª so that the sections 2' will be vertically disposed and these sections are preferably separable from each other to provide spaces 2ᵇ at any suitable intersection and thus to enable the formation from the sections 2' of sectional screens composed of any suitable number of sections and variable in width as desired or required for the holding and positioning of sensitized material in relation to a given image. While such screen is preferably formed of sections having their adjacent edges close together, it will be understood that, if desired, the sections forming the sectional screen may be somewhat separated from each other without affecting the utility of the device.

It will be seen that when a sectional screen of the desired size for a given image is formed, spaces 2ᵇ will be formed at opposite sides of said sectional screen and this will cause the edges of such sectional screen to be free and available for the connection thereto and the positioning thereon of clips or like devices which may be utilized to indicate the size or area of the image and the size of sensitized material necessary as well as for the fastening of the sensitized material to the said sectional screen.

As illustrated in Fig. 1, I have shown a sectional screen 3 formed of five sections but it will be understood that such sectional screen may be formed of any suitable number of sections and may be of any width within the limits of the width of the combined mounted elements in the frame.

In Figs. 1 and 2, I have shown the sectional members 2' each provided at its upper end with a hanger member 4 provided with rollers 5 mounted on a track 6 while the bottom edges of the screen sections are provided with similar hangers 4ª mounted to span a bar 7. The sections 2' are each preferably provided with set screws 9 so as to enable the secure fastening of the sections to the bar 7 in any given position.

It will be seen that in said construction, the sections 2', 2' are separately or independently movable in relation to each other in the same plane only and that spaces 2ᵇ may be formed at any dividing line between two sections so as to produce a sectional focusing screen which will not only enable proper focusing to be accomplished in relation to the camera lens but will provide a flat mounting surface for sensitized material which will have its edges free to permit the positioning of clips while the image is in vision on the screen, thus serving, after the capping of the lens when the image is no longer visible, as indicating devices for indicating the size or limits of the image and also serving as fastening means mounted on the edges of such sections for pieces of sensitized material of the exact size that may be required in any given case.

In Figs. 3 and 4, I have illustrated a modified form of my invention in which sectional members 2' are not only capable of separation laterally in the same plane but are also capable of separation transversely of that plane and in these figures I have shown a construction in which each section 2' is provided with hanger member 6' having rollers 5' mounted on transverse tracks 10 on a carrier member 11 which in turn moves on tracks 12, the tracks 12 being arranged in a plane parallel with the edges of the frame member 1 and the tracks 10 being arranged at right angles thereto. This construction thus enables the sections 2' to be movable not only laterally in the same plane but also enables the same to be moved transversely of that plane so that any sectional member 2' may be moved in two directions to more completely free the edges of the sectional screen and mounting which it is desired to use.

In Figs. 5, 6 and 7 I have shown a construction which is substantially similar to the construction shown in Figs. 1 and 2 except that I provide parallel to the track on which the sections are mounted a pair of mounting rods 13 on which are movably mounted clamp-bearings 14 to accommodate a light-tight container 15 in which a roll 16' of sensitized material 16 is encased. As shown, this container 15 is disposed at one end of the frame 1ˣ and at the other end of said frame is mounted a laterally adjustable rod 17 on movably mounted clamp bearings 14ª. Said rod 17 has adjustably mounted thereon by clamp bearing elements 18' so as to permit vertical adjustment thereof, a plurality and as shown a pair of elastic members such as springs 18 provided with fastening elements for the sensitized material such as end clips 19 attached thereto.

It will be seen from this construction that the roll of sensitized material may be moved along the rods 13 to any suitable position adjacent to a dividing line between adjacent sections so that the material therefrom may be fed without waste through a separated space between any two sections so as to abut flatly against the other face thereof and the opposite end of this strip may then be engaged by clips 19 on the elastic members 18, which also may be moved along rod 13 to any suitable position.

In Figs. 8 and 9 I have shown a light-proof box 1ʸ having mounted therein sectional screen elements 2ª. As illustrated, these sections are, at their upper ends, mounted by means of a mounting element 20 on a rod 21 and are similarly mounted at the lower end by mounting elements 20' on a rod 21'. Each of the mounting elements 20' are provided with set screws 22 to enable the positioning and secure fastening to the rod 21'. In this construction the box is provided at opposite sides of the sectional plates 2 with grooves 23 in which are mounted a pair of light-tight plates 23', 23'. Obviously the sections 2ª in this light-tight box may be separated and a piece of sensitized material or photographic plate 25 may be mounted thereon by clips 26.

Having described my invention, I claim:—

1. A combined focusing screen and retaining member for sensitized material composed of a series of sections comprising strips of transparent material, and means for mounting said transparent strips in adjustable relationship.

2. A combined focusing screen and retaining member for sensitized material composed of a series of sections each comprising a relatively narrow ground-glass strip, and each strip being mounted to be independently movable in relation to the other.

3. A combined focusing screen and retaining member for sensitized material composed of a series of sections each comprising a relatively narrow ground-glass strip unframed and having its transparency unobstructed throughout its entire width and each strip being mounted to be independently movable in relation to the other, and means for fastening a plurality of such sections in holder-producing position.

4. A combined focusing screen and retaining member for sensitized material composed of a series of sections each mounted to be independently movable in relation to the other, and fastening elements mountable in relation to the edges of the sectional screen to indicate the limits of the reflected image on the screen and to permit attachment of the sensitized material at the true position of said reflected image.

5. A combined focusing screen and retaining member for sensitized material composed of a series of sections divided vertically from each other combined to provide screen holders of varying sizes, and means for mounting each of such sections independently to be movable relatively to each other in a given plane.

6. A combined focusing screen and retaining member for sensitized material composed of a series of sections divided vertically from each other combined to provide screen holders of varying sizes, means for mounting each of such sections independently to be movable relatively to each other in a given plane, and fastening elements mountable in relation to the edges of the sectional screen to indicate the limits of the reflected image on the screen and to permit attachment of the sensitized material at the true position of said reflected image.

7. A combined focusing screen and retaining member for sensitized material composed of a mounting frame and a series of sections divided vertically from each other combined to provide screen holders of varying sizes, means for mounting each of such sections independently to be movable relatively to each other in a given plane, and means for fastening such sections in given positions within the limits of the mounting frame.

8. A combined focusing screen and retaining member for sensitized material composed of a mounting frame and a series of sections divided vertically from each other combined to provide screen holders of varying sizes, means for mounting each of such sections independently to be movable relatively to each other in a given plane, means for fastening such sections in given positions within the limits of the mounting frame, and means for moving each of said sectional elements in a plane at right angles to the given plane hereinabove first mentioned.

9. A combined focusing screen and retaining member for sensitized material composed of a series of sections each mounted to be independently movable in relation to the other, means for fastening a plurality of such sections in holder-producing position, and means on said frame for mounting a roll of sensitized paper.

10. A combined focusing screen and retaining member for sensitized material composed of a mounting frame and a series of sections divided vertically from each other combined to provide screen holders of varying sizes, means for mounting each of such sections independently to be movable relatively to each other in a given plane, means for fastening such sections in given positions within the limits of the mounting frame, and means on said frame for mounting a roll of sensitized paper.

11. A combined focusing screen and retaining member for sensitized material composed of a mounting frame and a series of sections divided vertically from each other combined to provide screen holders of varying sizes, means for mounting each of such sections independently to be movable relatively to each other in a given plane, means for fastening such sections in given positions within the limits of the mounting frame, means on said frame for mounting a roll of sensitized paper, and means at the opposite end of the frame for adjustably mounting fastening devices to fasten the free end of the sensitized paper fed from said roll.

12. A combined focusing screen and retaining member for sensitized material composed of a mounting frame and a series of sections divided vertically from each other combined to provide screen holders of varying sizes, means for mounting each of such sections independently to be movable relatively to each other in a given plane, means for fastening such sections in given positions within the limits of the mounting frame, means on said frame for mounting a roll of sensitized paper, and clips adjustably mounted at the opposite end of the frame on elastic elements for fastening the free end of the sensitized paper fed from said roll.

13. A combined focusing screen and retaining member for sensitized material composed of a mounting frame and a series of sections divided vertically from each other and combined to provide sectional screens of varying sizes, means for mounting each of such sections independently to be movable relatively to each other in a given plane, means for fastening such sections in given positions within the limits of the mounting frame, and light-tight shutter members mounted in said frame at opposite sides of said sectional focusing screen for producing a light-tight holder.

In witness whereof, I have signed my name to the foregoing specification.

ELLIS WEISKER.